June 30, 1953  E. A. SCHUMACHER ET AL  2,644,024
ANODE ASSEMBLY FOR PRIMARY GALVANIC CELL
Filed Sept. 28, 1949
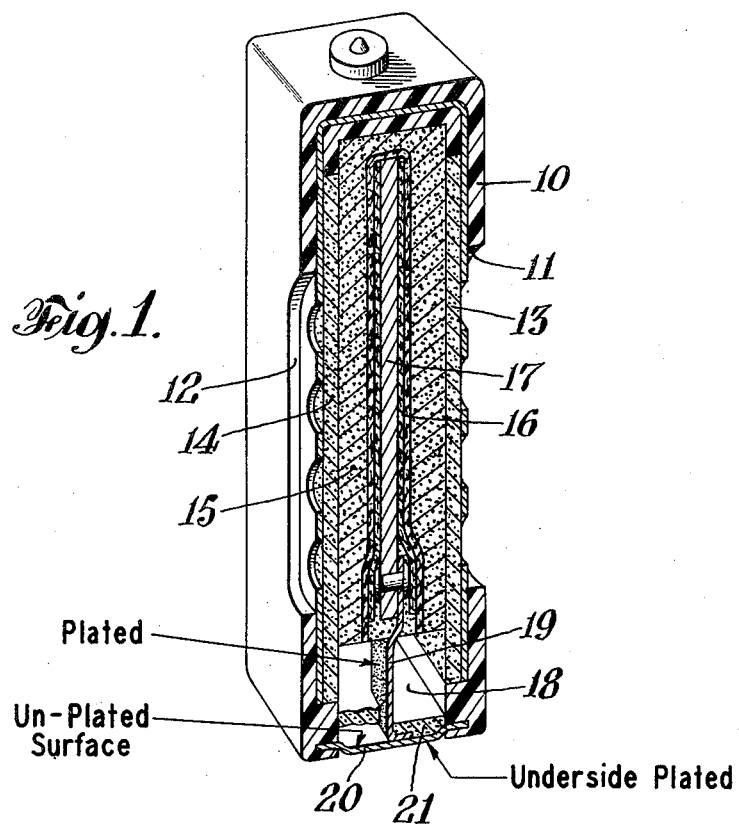
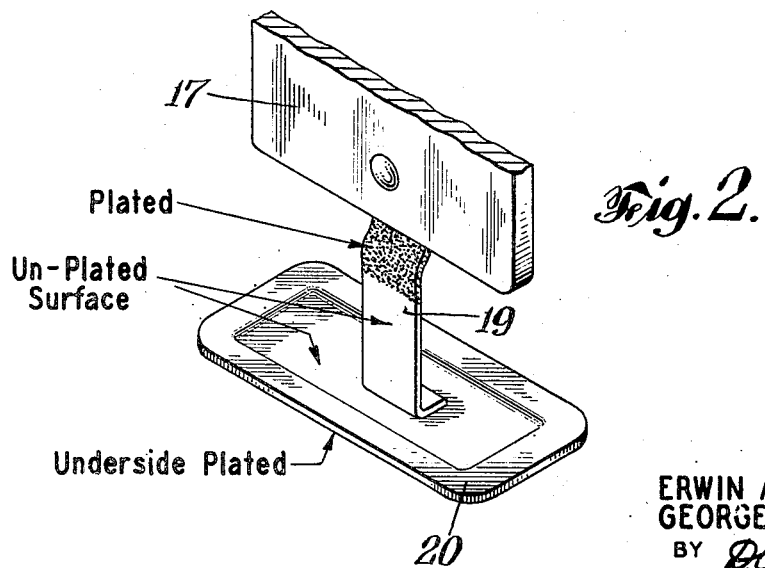
INVENTORS
ERWIN A. SCHUMACHER
GEORGE W. HEISE
BY D.C. Harrison
ATTORNEY Patented June 30, 1953

2,644,024

UNITED STATES PATENT OFFICE 2,644,024

ANODE ASSEMBLY FOR PRIMARY GALVANIC CELL

Erwin A. Schumacher, Parma, and George W. Heise, Cleveland, Ohio, assignors, by mesne assignments, to Union Carbide and Carbon Corporation, a corporation of New York Application September 28, 1949, Serial No. 118,206

4 Claims. (Cl. 136—135)

This invention relates to primary galvanic cells and refers more particularly to an anode assembly for primary galvanic cells of the type having an immobilized alkaline electrolyte.

In primary galvanic cells of the type utilizing a zinc electrode it is conventional practice to amalgamate the zinc electrode to minimize localized corrosion and the formation of gas internally of the cell.

The use of amalgamated zinc as anodes in primary cells of the type employing an immobilized alkaline electrolyte gives rise to special problems. In cells of this type the amalgamated anode must not emerge from the electrolyte because of excessive corrosion of the zinc at the air-electrolyte interface. Consequently, a metal connecting member must be attached to the anode and to an external terminal for the cell. The connector introduces new difficulties in that steel, which would otherwise be satisfactory for use as a connector is sufficiently cathodic to zinc to cause excessive corrosion of the zinc at the point of attachment of the connector to the anode leading to failure of the connection and consequent uselessness of the cell.

Proposals to overcome the difficulties caused by potential differences between the metal of the connector and the zinc anode by employing for the connector a readily amalgamable metal such as copper or by copper-plating a steel or iron connector have not satisfactorily solved the problem and actually have introduced a new problem. Thus, when the connector is amalgamable, mercury, released by electrochemical dissolution of the anode upon cell discharge, migrates along the connector past the sealing materials customarily used at the closure of the cell ultimately covering the external terminal surface. Protective coatings applied to the portions of the connector in the air space with which such cells are provided are lifted by the migrating mercury, permitting access of air to the anode and accelerated wasteful corrosion of the zinc.

The net result of such mercury creepage is a loss in cell effectiveness and a hazard for the user of the cell. Mercury creepage destroys sealing effectiveness and quite commonly is accompanied by leakage of electrolyte. Furthermore, in cells intended for intimate personal use, as in hearing aids, a freely exposed mercury surface is highly undesirable.

It is the principal object of this invention to solve these problems. More specifically, it is an object of the invention to provide an anode assembly for use in a primary galvanic cell of the type utilizing an immobilized alkaline, which assembly prevents migration of mercury externally of the cell.

In accordance with the invention these objects are achieved by the interposition in an anode assembly of a barrier over which mercury cannot readily pass. The invention comprises the combination of an amalgamated zinc electrode immersed in immobilized alkaline electrolyte and a metal connecting member emergent from the electrolyte and attached to the zinc electrode and to a metal member which serves both as a closure and an external terminal for the cell, at least a portion of at least one of such members having a difficultly-amalgamable surface.

In the accompanying drawing:

Fig. 1 is a vertical sectional view of a primary galvanic cell having an immobilized alkaline electrolyte and provided with an anode assembly according to the invention; and Fig. 2 is a view of a modified form of anode assembly, part being broken away.

Referring to the drawing, there is shown in Fig. 1 as an example of the type of cell for which the invention is ideally suited, a cell of the type described in U. S. patent application Serial No. 52,018, filed September 30, 1948, by P. A. Marsal and R. P. Fox, now Patent No. 2,597,116. This cell comprises a container 10 having apertures 11, 12 for the admission of air to a pair of air-depolarizable carbonaceous electrodes 13, 14. An immobilized aqueous alkaline electrolyte 15 supported by a plurality of layers 16 of fibrous material occupies the space between the electrodes 13, 14 and an amalgamated zinc electrode 17, an air space 18 being provided at one end of the cell. A connector member 19 is attached (suitably by rivetting or welding) to the zinc electrode 17 and to a metal closure member 20 which serves as an external terminal. The cell is sealed internally by a layer 21 of a suitable material such as wax.

In accordance with the invention the connector member 19 between the amalgamated zinc electrode 17 and the closure-terminal member 20 may be made of steel (or iron) or magnesium. When these members are made of steel, it is necessary that at least the portions of the connector member which are immersed in or wet by the electrolyte be coated with a readily-amalgamable metal such as copper (or brass), tin, or zinc to prevent setting up an iron-zinc couple. However, surfaces of either the closure-terminal member or the connector member or both which are not wet by electrolyte are not coated but present a bare iron surface which, being difficultly amalgamable, provide a barrier over which mercury can not readily pass. In the modification shown in Fig. 1, the entire connector member 19 is coated, preferably with copper, but the inner surface of the closure-terminal member 20 is uncoated. In the modification shown in Fig. 2, the lower portion of the connector member 19 is uncoated as is the inner surface of the closure-terminal member 20.

When the anode assembly of the invention including plated steel members as shown in Figs. 1 and 2 and as just described is inserted in the immobilized alkaline electrolyte of a primary cell, the surfaces which are plated with readily-amalgamable metal are quickly amalgamated by mercury migrating from the amalgamated anode. The high hydrogen overvoltage of the amalgamated surface polarizes the zinc-connector couple and minimizes the corrosion current and resultant excessive corrosion of zinc. Further movement of mercury beyond the amalgamated surfaces is, however, prevented by the barrier of uncoated iron surfaces. It is essential, as already indicated, that this barrier be located outside the area wet by electrolyte.

When the connector member 19 and closure-terminal member 20 are made of magnesium, or magnesium-base alloy, it is not necessary that any portion thereof be coated with readily-amalgamable metal. This is true because magnesium does not set up a potential difference with zinc in alkaline solution and there is therefore no danger of excessive, localized corrosion of zinc at the point of connection between the anode and the connector member. Since magnesium is not amalgamated in contact with mercury, the connector member and closure-terminal member when made of magnesium provide an effective barrier against mercury creepage. The construction of the anode assembly of the invention when magnesium connector and closure-terminal members are employed is identical with that shown in the drawing save for the elimination of the coating of amalgamable metal.

As indicated in the drawing, the external surfaces of the closure-terminal member of the anode assembly of the invention may be plated, if desired, suitably with brass, to present an attractive appearance and, particularly when the member is made of steel, to prevent interference with good electrical contact by the formation of rust.

Although the invention has been described with particular reference to one specific type of cell it is not limited to use in that cell but is applicable to any cell employing an amalgamated zinc electrode immersed in immobilized alkaline electrolyte.

As used herein, the term "steel" includes any steel or iron-base alloy the surface of which is not amalgamable in contact with mercury and alkaline electrolyte, and the term "magnesium" includes any magnesium base alloy which is not amalgamable under the same conditions.

We claim:
1. An air-depolarized primary galvanic cell comprising in combination a container closed at one end only and having an aperture in its side walls for entry of air; an air-depolarizable carbonaceous electrode covering said aperture; terminal means extending through said closed end of said container and making electrical contact with said carbonaceous electrode; an immobilized electrolyte; an amalgamated zinc electrode in said electrolyte; a unitary metal closure-terminal member forming a seal in cooperation with said side-walls for the open end of said container; and a metal connecting member having one of its ends attached to said closure-terminal member outside of said electrolyte and its other end immersed in said electrolyte and electrically connected to said amalgamated zinc electrode, at least a portion of at least one of said members having a difficultly amalgamable surface extending across the possible path of mercury migration, thereby preventing migration of mercury from said zinc electrode, consequent disruption of said seal, and eventual escape of mercury from the cell.

2. An air-depolarized primary galvanic cell comprising in combination a container closed at one end only and having an aperture in its side walls for entry of air; an air-depolarizable carbonaceous electrode covering said aperture; terminal means extending through said closed end of said container and making electrical contact with said carbonaceous electrode; an immobilized electrolyte; an amalgamated zinc electrode in said electrolyte; a unitary metal closure-terminal member forming a seal in cooperation with said sidewalls for the open end of said container; and a metal connecting member having one of its ends attached to said closure-terminal member outside of said electrolyte and its other end immersed in said electrolyte and electrically connected to said amalgamated zinc electrode, at least the portion of said connecting member attached to said zinc electrode having a readily-amalgamable surface and at least a portion of said terminal-closure member having a difficultly amalgamable surface extending across the possible path of mercury migration, thereby preventing migration of mercury from said zinc electrode, consequent disruption of said seal, and eventual escape of mercury from the cell.

3. In the combination defined by claim 1, a magnesium connecting member and a magnesium closure-terminal member.

4. In the combination defined by claim 2, a steel connecting member and a steel closure-terminal member at least the portion of said connecting member attached to said zinc electrode being copper coated.

ERWIN A. SCHUMACHER.
GEORGE W. HEISE.

References Cited in the file of this patent
UNITED STATES PATENTS

| Number | Name | Date |
|---|---|---|
| 425,818 | McLaughlin | Apr. 15, 1890 |
| 2,491,879 | Teague | Dec. 20, 1949 |